Aug. 23, 1932.   J. F. O'MALLEY   1,873,662
SUPPLEMENTAL ADJUSTABLE WING FOR AIRCRAFT
Filed July 18, 1931   2 Sheets-Sheet 1

WITNESSES

INVENTOR
John F. O'Malley
BY Munn & Co.
ATTORNEYS

Aug. 23, 1932. J. F. O'MALLEY 1,873,662
SUPPLEMENTAL ADJUSTABLE WING FOR AIRCRAFT
Filed July 18, 1931 2 Sheets-Sheet 2

INVENTOR
John F. O'Malley

Patented Aug. 23, 1932

1,873,662

UNITED STATES PATENT OFFICE

JOHN F. O'MALLEY, OF NEW YORK, N. Y.

SUPPLEMENTAL ADJUSTABLE WING FOR AIRCRAFT

Application filed July 18, 1931. Serial No. 551,764.

This invention relates to aircraft, and comprehends a supplemental adjustable wing which is especially applicable to airplanes, seaplanes or other heavier-than-air craft.

The invention aims for one of its principal objects to provide a supplemental wing which when in normal position lends added wing support or sustaining surface to the craft when flying, and which when shifted to vary its angle of attack relative to the fixed wing or wings affords a head resistance in landing or maneuvering the plane.

The invention further resides in the provision of an adjustable supplemental wing having actuating means under the direct control of a pilot, and by virtue of which the same may be set and maintained in its normal or various angular positions.

The invention further contemplates an adjustable supplemental wing which may be positioned below, above, in front or in the rear of a main stationary wing, or between a pair of wings where the craft is provided with a plurality of wings, so as to afford an additional control means for maneuvering the craft.

Other objects of the invention reside in the provision of an adjustable supplemental wing, which is simple in its construction and mode of use, economical to produce and install and which is highly efficient in its purpose.

With the above recited and other objects in view reference is made to the following specifications and accompanying drawings in which there is illustrated a preferred embodiment of the invention, while the claims define the actual scope thereof.

In the drawings—

Figure 1:
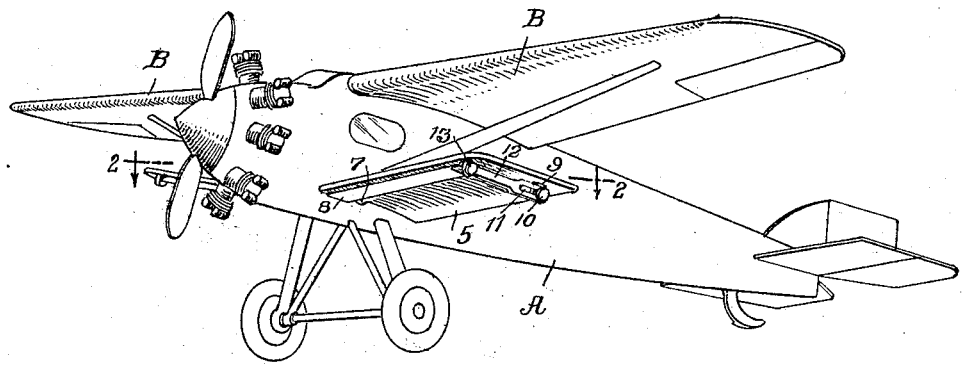
Figure 1 is a perspective view of monoplane equipped with a supplemental adjustable wing constructed in accordance with the invention.
Figure 2:
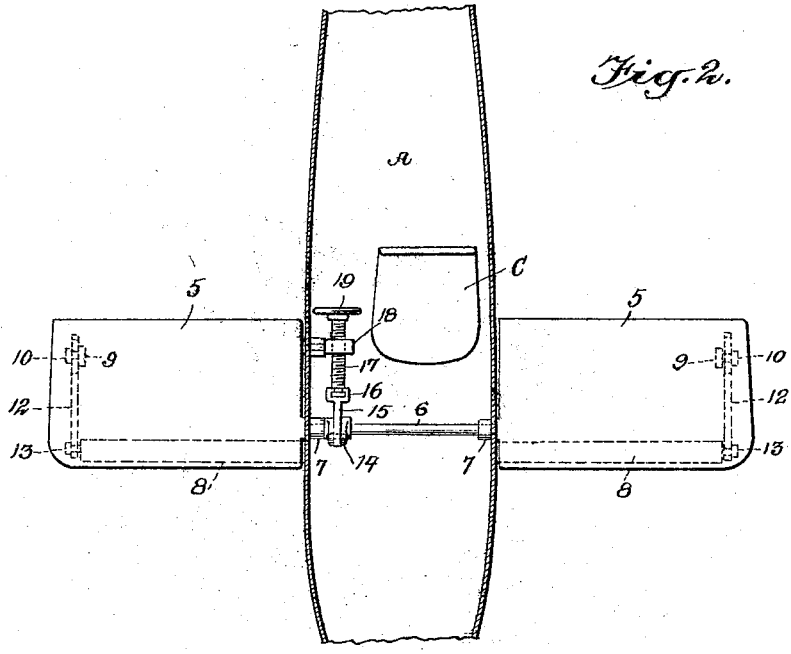
Figure 2 is a fragmentary horizontal sectional view taken approximately on the line indicated at 2—2 in Figure 1.

Referring to the drawings by characters of reference, A designates the fuselage of an airplane and B the stationary wings. As illustrated, the present invention resides in the provision of a pair of supplemental adjustable wings 5 which are disposed on opposite sides of the fuselage A and which are secured to a transverse shaft 6 mounted for rotatory movement in bearings 7 carried by the fuselage. A pair of laterally projecting stream-lined struts 8 underlie the leading or entering edge of the wings 5 and extend laterally downwardly from the fuselage to a point adjacent the outer free ends of the wings 5. Each wing 5 adjacent its rear or trailing edge is formed with an outwardly projecting bracket 9 having a laterally outwardly protruding stud 10 receiving thereover a slotted rear extremity 11 of a link 12, which is fulcrumed as at 13 to the strut 8. This link connection affords additional support for the wing in its normal or various angular positions.

In order to provide means for turning the shaft 6 to vary the angle of attack of the wing 5, said shaft 6 has secured thereto and projecting radially therefrom an arm 14, which arm at its free end is connected to drag link 15 having swivelled connection as at 16 with a threaded shank 17 of the screw. The screw threadedly engages a stationary bearing member 18, and is adapted upon turning movement in the bearing 18 to advance or retract the drag link 15 for imparting rotatory motion to the shaft 6.

The screw 17 is provided with a manipulating head 19 located adjacent the pilot's seat C, whereby the actuation of the supplemental wings 5 is under the direct control of the pilot. It is apparent that the employment of the screw 17 provides a means which adjusts the angle of attack of the wings while operating to lock and maintain the same in their adjusted positions.

Figure 3:
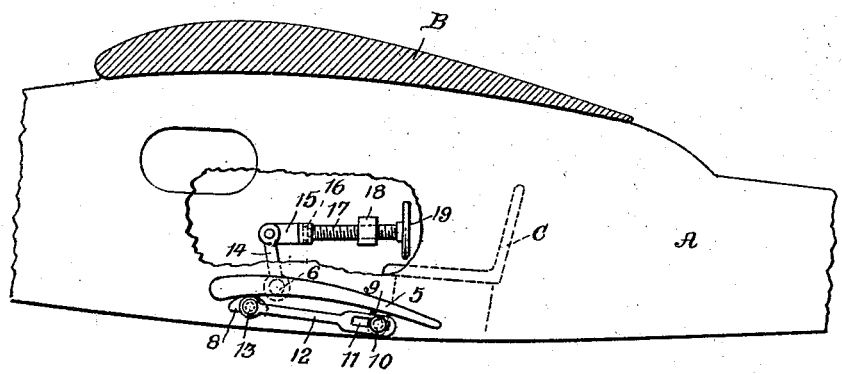
Figure 3 is a fragmentary side view with parts broken away to disclose the underlying structure, and illustrating a supplemental adjustable wing in its normal position.
Figure 4:
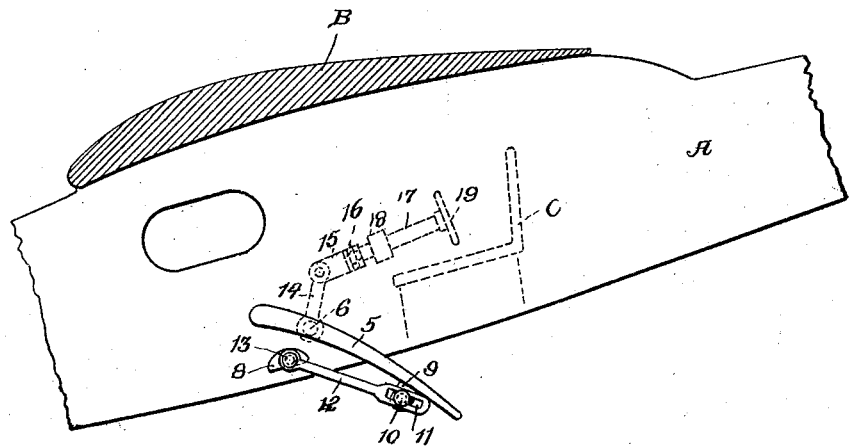
Figure 4 is a similar view illustrating the supplemental wing adjusted to an angular position.

When in the normal position illustrated in Figure 3 the supplemental wings 5 lend added support and sustaining surface to the main wings B, and when shifted therefrom to various angular positions said supplemental wings offer, when flying, a resistance to the forward motion of the craft for the purpose of negotiating a slow and safe landing or for righting the craft. The supplemental wings may also serve in the capacity of means for negotiating a more rapid take-off, thus lessening the necessary run over the ground.

While there has been illustrated and described a single and preferred embodiment of the invention, it is to be understood that the showing is merely illustrative and is not intended as a limitation upon the scope of the claims.

What is claimed is:

1. In an airplane, a wing supplementing the main wing and adjustable to vary its angle of attack with reference to the main wing, mechanism controllable by the pilot for adjusting said supplemental wing and for maintaining the same in a set position and means for bracing said supplemental wing adjacent its outer end, comprising a rigid strut, a brace link pivoted thereto and having sliding and pivotal connection with the supplemental wing adjacent its trailing edge.

2. In an airplane, a wing supplementing the main wing and adjustable to vary its angle of attack with reference to the main wing, mechanism controllable by the pilot for adjusting said supplemental wing and for maintaining the same in a set position, and means for bracing said supplemental wing adjacent its outer end, comprising a rigid strut parallel to and adjacent the entering edge of the supplemental wing, a brace link pivoted thereto and having sliding and pivotal connection with the supplemental wing adjacent its trailing edge.

JOHN F. O'MALLEY.